US007885549B1

(12) United States Patent
Thinguldstad et al.

(10) Patent No.: US 7,885,549 B1
(45) Date of Patent: Feb. 8, 2011

(54) FACILITATING AUTOMATED SERVICE ACTIVATION ON PASSIVE OPTICAL NETWORKS

(75) Inventors: Arthur Martin Thinguldstad, Raleigh, NC (US); Jonathan Stuart Huffman, Raleigh, NC (US); David Keith Hansen, Raleigh, NC (US); Duane Richard Remein, Raleigh, NC (US)

(73) Assignee: Alcatel Lucent, Paris (FR)

(*) Notice: Subject to any disclaimer, the term of this patent is extended or adjusted under 35 U.S.C. 154(b) by 1836 days.

(21) Appl. No.: 10/639,311

(22) Filed: Aug. 12, 2003

(51) Int. Cl.
*H04B 10/00* (2006.01)

(52) U.S. Cl. .................... 398/168; 398/167.5; 398/166; 398/165; 398/66

(58) Field of Classification Search ................. 398/168, 398/66, 71, 167.5, 166, 165, 70; 370/218, 370/390
See application file for complete search history.

(56) References Cited

U.S. PATENT DOCUMENTS

| | | | | |
|---|---|---|---|---|
| 5,859,895 A * | 1/1999 | Pomp et al. | ................. | 379/9.05 |
| 5,872,645 A * | 2/1999 | Proctor | ......................... | 398/99 |
| 6,349,093 B1 * | 2/2002 | Caldwell et al. | ............ | 370/259 |
| 6,920,287 B1 * | 7/2005 | Hinds et al. | .................... | 398/9 |
| 7,274,881 B2 * | 9/2007 | Hochbaum | .................. | 398/162 |
| 2002/0150097 A1 * | 10/2002 | Yen et al. | ..................... | 370/390 |
| 2005/0002669 A1 * | 1/2005 | Adleman et al. | .............. | 398/58 |

* cited by examiner

*Primary Examiner*—Ken N Vanderpuye
*Assistant Examiner*—Hibret A Woldekidan
(74) *Attorney, Agent, or Firm*—RG & Associates (57) ABSTRACT

One embodiment of the disclosures made herein is a method for activating services in a Passive Optical Networking (PON) system. In accordance with such an embodiment, an Optical Line Terminal (OLT) within the PON system is pre-provisioned with PON services and with at least a portion of information required for facilitating automatic activation of the PON services. Pre-provisioning is defined herein to mean that such provisioning is performed prior to installing an ONT (i.e., a network interface device) that will serve such to services at the service subscriber's site and that is controlled by the OLT. After installation of the ONT is complete, the PON services served by the ONT are automatically activated using at least a portion of the pre-provisioned information and information discovered about the ONT during a post-installation discovery process. For example, to enable the PON services to be automatically activated after the ONT is installed, network element management software of the PON system is adapted to automatically check the ONT selected for installation against a database of legitimate units. After the installed ONT is verified as a legitimate unit, the PON services are automatically activated. By providing such an automated mechanism for supporting the activation of PON services at the ONT, resources utilization for performing various system management activities (e.g., provisioning at the central office, ONT install, etc) are advantageously reduced.

22 Claims, 9 Drawing Sheets

FACILITATING AUTOMATED SERVICE ACTIVATION ON PASSIVE OPTICAL NETWORKS

FIELD OF THE DISCLOSURE

The disclosures made herein relate generally to passive optical networks and more particularly to facilitating service activation on passive optical networks.

BACKGROUND

Passive Optical Networking (PON) enables the shared use of fiber for services such as data, voice and video over most of the distance between a central office and service subscriber sites. PON is significantly less expensive to deploy and operate due to the to compact size and passive nature of much of the equipment comprised by the PON facilities. For example, a passive optical splitter that fans the fiber out to service subscribers in a PON is relatively small, uses no electronics and requires no power source.

Current and emerging PON solutions offer cost-effective, end-to-end solutions that are capable of delivering a combination of high-demand services. Specific examples of such current and emerging PON solutions include Broadband PON (BPON), Ethernet PON (EPON) and Gigabit PON (GPON). Examples of services that can be provided via such PON solutions include various types of telephony services, data transmission services and video services. Signals for such services are transported optically from the central office (CO) or headend (HE) to an optical-network termination unit (referred to herein as the ONT) at a service subscriber's site. The ONT is configured to provide optical network termination functionality and, in some implementations, to also provide conventional network interface device functionality.

Before a service subscriber can receive requested services via PON, an ONT must be installed at the service subscriber's site and requested services must be activated. The conventional approach for activating service for a particular service subscriber is performed in conjunction with installing the subscriber's ONT. A field technician, commonly referred to as a Craft, carries out physical installation of an ONT (e.g., a ONT having a particular serial number) at a new subscriber's site. After the ONT is installed, the Craft initiates communication with a service activator (i.e., a person) who performs activation of the subscriber's service, with the Craft providing manual provisioning assistance as needed at the subscriber site. Activating the PON services includes provisioning the requested services and associating the provisioned services with the ONT. Installing ONT's and activating services are components of managing subscriber services (e.g., telephony, video and/or data services) provided via a BPON.

One limitation of the conventional approach for facilitating activation of PON services is that it leaves the Craft with the responsibility of selecting the correct ONT to install. This responsibility often leads to an incorrect ONT (e.g., having an incorrect serial number) being installed during a particular visit to the subscriber site. Accordingly, a subsequent trip to the subscriber's site is required to install the correct ONT (e.g., an ONT having a serial number assigned by Element Management Software) or after the installed but presently incorrect ONT is associated with an information instantiation (e.g., database record, object, etc) associated with the subscriber. The need to make multiple trips to the subscriber's site is undesirable for both the subscriber and the service provider. The alternative to making multiple trips is for the Craft to wait at the subscriber's site until resources at the service provider's facilities resolve the situation. Waiting for such resolution is costly due to downtime of the Craft.

Another limitation of the conventional approach for managing subscriber services is that it is not scalable to large subscriber populations in an efficient and effective manner. Once the Craft has physically installed the correct ONT for a particular subscriber, the Craft must initiate communication between the service provider facility (e.g., a central office) and the ONT for verifying correct association between the provisioned services for the subscriber and the presence of the correct ONT. This requirement is cumbersome and inefficient in view of a large and growing subscriber population as is couples the provisioning process with the physical installation process. Furthermore, as the installation of an incorrect ONT is typically not recognized until this communication is initiated, valuable resource of the service subscriber (e.g., communication system usage, personnel time, etc) are wasted due to an incorrect ONT being installed.

Therefore, methods and equipment adapted for facilitating activation of PON services at subscriber sites in a manner that overcomes limitations associated with conventional approaches for facilitating activation of PON services at subscriber sites would be useful.

BRIEF SUMMARY

In one embodiment, a method for activating services in a Passive Optical Networking (PON) system, comprises facilitating pre-provisioning of an Optical Line Terminal (OLT) within a PON system wherein said pre provisioning includes provisioning PON services on the OLT prior to installing an Optical Network Termination unit (ONT) controlled by the OLT, and facilitating automatic activation of said PON services after installation of the ONT is completed, wherein said PON services are served by the ONT.

In another embodiment, a computer readable medium comprises instructions processable by at least one element of a Passive Optical Network (PON) system, and an apparatus from which said instructions are accessible by said at least one element of the PON system, wherein said instructions are adapted for enabling said at least one element of the PON system to facilitate: pre-provisioning of an Optical Line Terminal (OLT) within a PON system, wherein said pre provisioning includes provisioning PON services on the OLT prior to installing an Optical Network Termination unit (ONT) controlled by the OLT, and automatic activation of said PON services after installation of the ONT is completed, wherein said PON services are served by the ONT.

In a further embodiment, a computer readable medium comprises instructions processable by at least one element of a Passive Optical Network (PON) system, and an apparatus from which said instructions are accessible by said at least one element of the PON system, wherein said instructions are adapted for enabling said at least one element of the PON system to facilitate: pre-provisioning an Optical Line Terminal (OLT) within a PON system with PON services and with at least a portion of information required for facilitating automatic activation of said PON services prior to installing an Optical Network Termination unit (ONT) controlled by the OLT, and automatically activating said PON services served by the ONT after installation of the ONT is complete, wherein said activating includes discovering information associated

DETAILED DESCRIPTION OF THE DRAWING FIGURES

The disclosures made herein relate to facilitating automated service activation of PON services at a service subscriber site. Unlike conventional approaches to activating PON services, methods and equipment in accordance with embodiments of the disclosures made herein are adapted for enabling the provisioning of PON services to be decoupled from the physical installation of an appropriate network interface device installed at the service subscriber's site. Through such decoupling, activation of PON services of service subscribers can be automated. Automated activation enables resources of the service provider to be utilized more efficiently and effectively. For example, PON services of a service subscriber can be activated with a singe trip to the subscriber's physical location, as opposed to multiple trips often required with conventional approaches to facilitating activation of PON services. Furthermore, in certain embodiments, the need to select a specified ONT from a collection of available ONT's is eliminated.

Before a service subscriber can receive service via PON, an appropriate network interface device must be installed at the service subscriber's site and the subscriber's service on the PON must be activated. An ONT is a typical type of network interface device that serves PON services at service subscriber's site. Activation of the PON services enables the service to access selected telephony, video and data services.

In accordance with at least one embodiment of the disclosures made herein, an Optical Line Terminal (OLT) within a PON system is pre-provisioned with PON services and with at least a portion of information required for facilitating automatic activation of the PON services. Pre-provisioning is defined herein to mean that such provisioning is performed prior to installing an ONT (i.e., a network interface device) that will serve such services at the service subscriber's site and that is controlled by the OLT. After installation of the ONT is complete, the PON services served by the ONT are automatically activated using at least a portion of the pre-provisioned information and information discovered about the ONT during a post-installation discovery process. For example, to enable the PON services to be automatically activated after the ONT is installed, network element management software of the PON system is adapted to automatically check the ONT selected for installation against a database of legitimate units. After the installed ONT is verified as a legitimate unit, the PON services are automatically activated. By providing such an automated mechanism for supporting the activation of PON services at the ONT, resources utilization for performing various system management activities (e.g., provisioning at the central office, ONT install, etc) are advantageously reduced.

Figure 1:
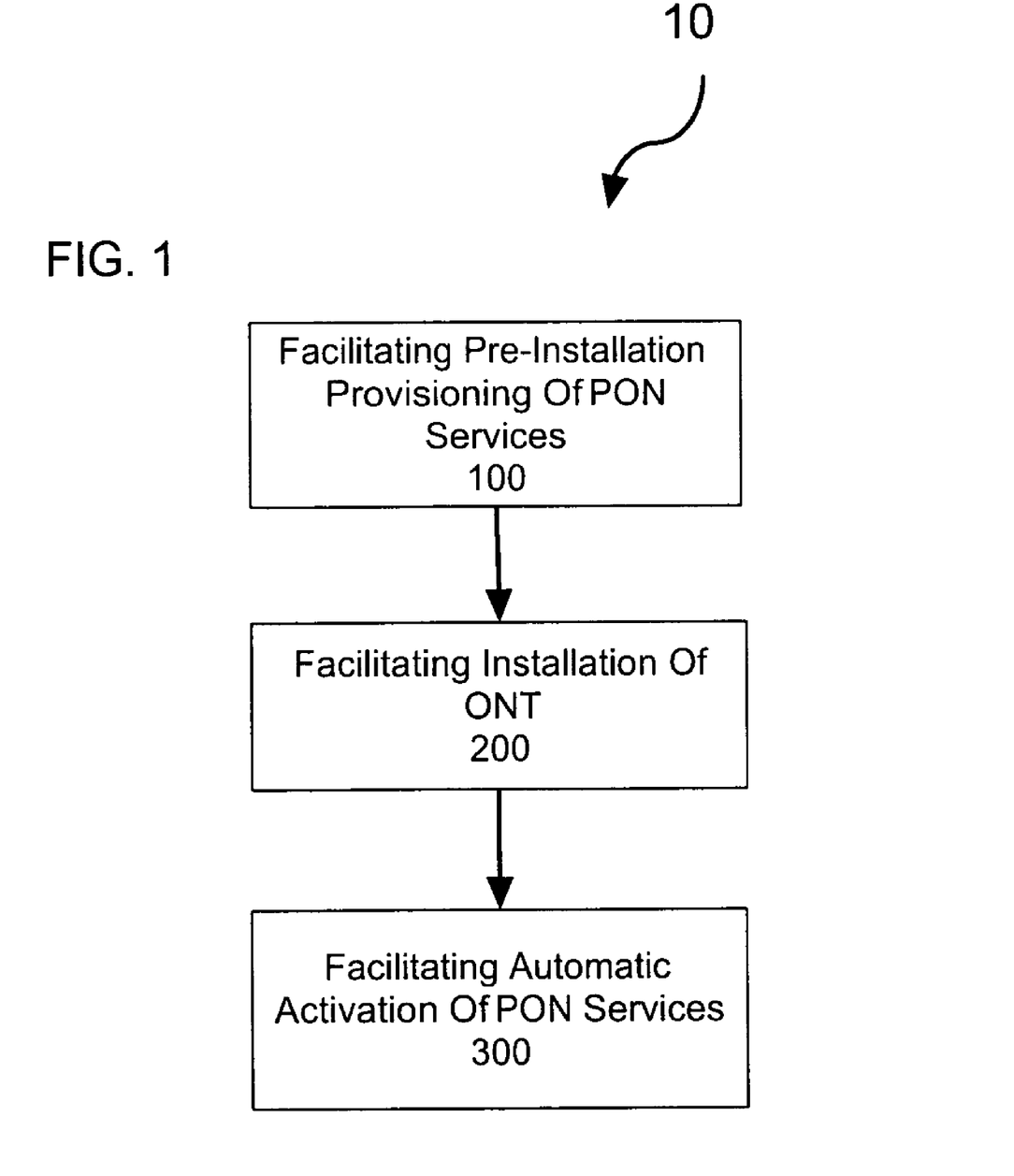
FIG. 1 depicts a method for facilitating activation of PON services at a service subscriber site in accordance with an embodiment of the disclosures made herein.

Turning now to discussion of specific drawings, a method 10 for facilitating activation of PON services in accordance with an embodiment of the disclosures made herein is depicted in FIG. 1. The method 10 begins with facilitating pre-installation provisioning of an OLT with PON services (at a block 100). Examples of PON services include telephony services such as POTS (i.e., Plain Old Telephone Service), data services and video services. After pre-provisioning is completed, the method 10 includes facilitating installation (i.e., physical installation by a service provider craft person) of an ONT that is controlled by the OLT and that serves the PON services at a service subscriber site (at a block 200). The method 10 includes facilitating automatic activation of the pre-provisioned PON services (at a block 300) after installation of the ONT is successfully completed (e.g., after the ONT is physically installed and passes a self-test). In response to completion of the automatic activation of pre-provisioned PON services, the service subscriber is enabled access to the pre-provisioned PON services.

Figure 2:
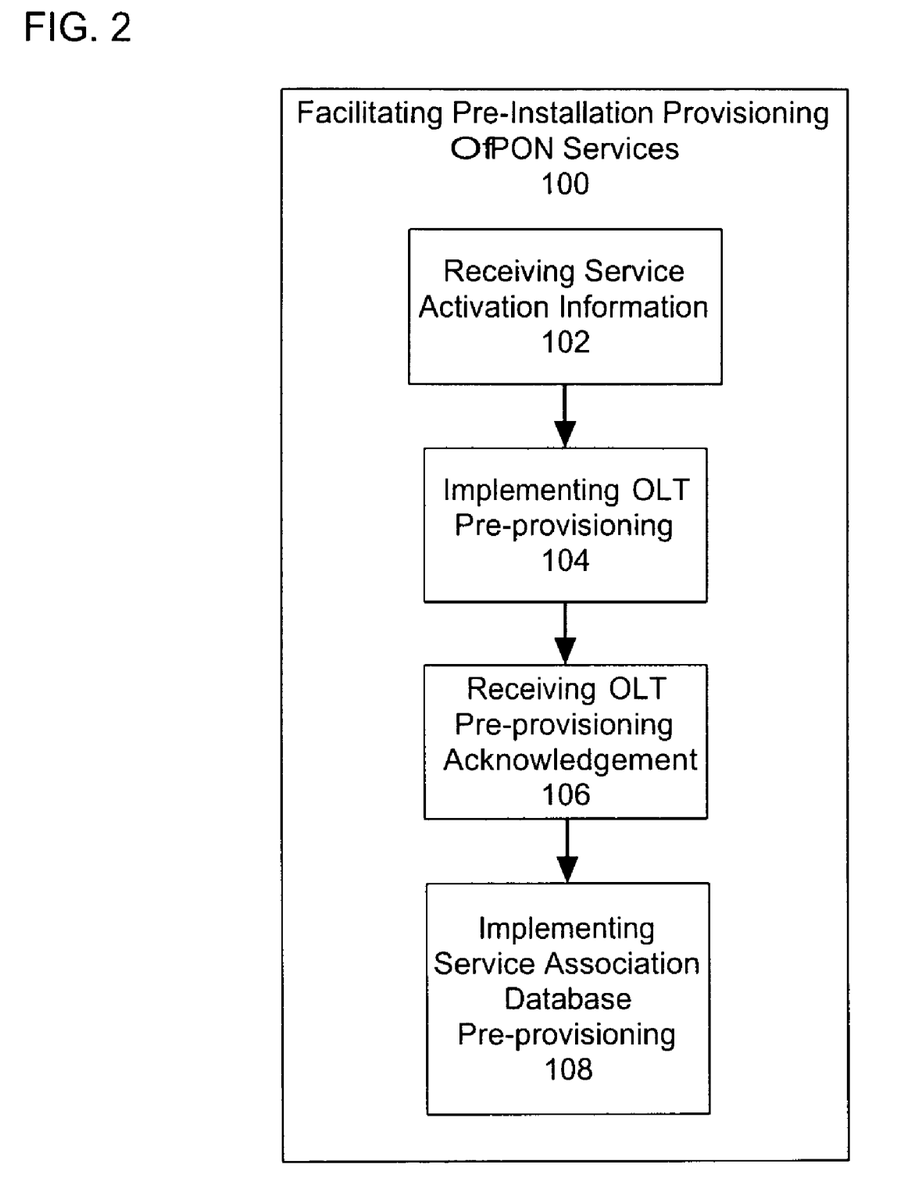
FIG. 2 depicts an embodiment of facilitating the pre-installation provisioning of PON services depicted in FIG. 1.

FIG. 2 depicts an embodiment of facilitating the pre-installation provisioning of PON services referred to in FIG. 1 at the block 100. An operation 102 is performed for receiving PON service activation information at an Element Management System (EMS) of the PON (e.g., inputted into the EMS by a service order processor). Service profiles, service specification information, subscriber information, ONT access identifiers are examples of service activation information.

After receiving the PON service activation information, an operation 104 is performed for implementing pre-provisioning of the OLT for providing PON services via an arbitrary ONT controlled by the targeted OLT. An ONT included in a collection of available and legitimate ONT's is an example of an arbitrary ONT within the scope of the disclosures made herein. Provisioning the OLT includes provisioning the OLT with PON services and with at least a portion of the information required for facilitating automatic activation of the PON services. An embodiment of pre-provisioning the OLT with at least a portion of the information required for facilitating automatic activation of the PON services includes the EMS automatically extracting at least a portion of such information from the PON service activation information.

An operation 106 is performed for receiving an OLT pre-provisioning acknowledgement after pre-provisioning is successfully completed. In response to receiving the OLT pre-provisioning acknowledgement, an operation 108 is performed for implementing Service Association Database (SAD) pre-provisioning. One embodiment of implementing pre-provisioning of the SAD includes provisioning a change file of the SAD with at least a portion of the information required for facilitating automatic activation of the PON services. An ONT serial number (e.g., a default serial number that designated an unprovisioned status), an ONT access identifier, site information (e.g., a site identifier) and a time stamp are examples of information provisioned in the Service Association Database.

Figure 3:
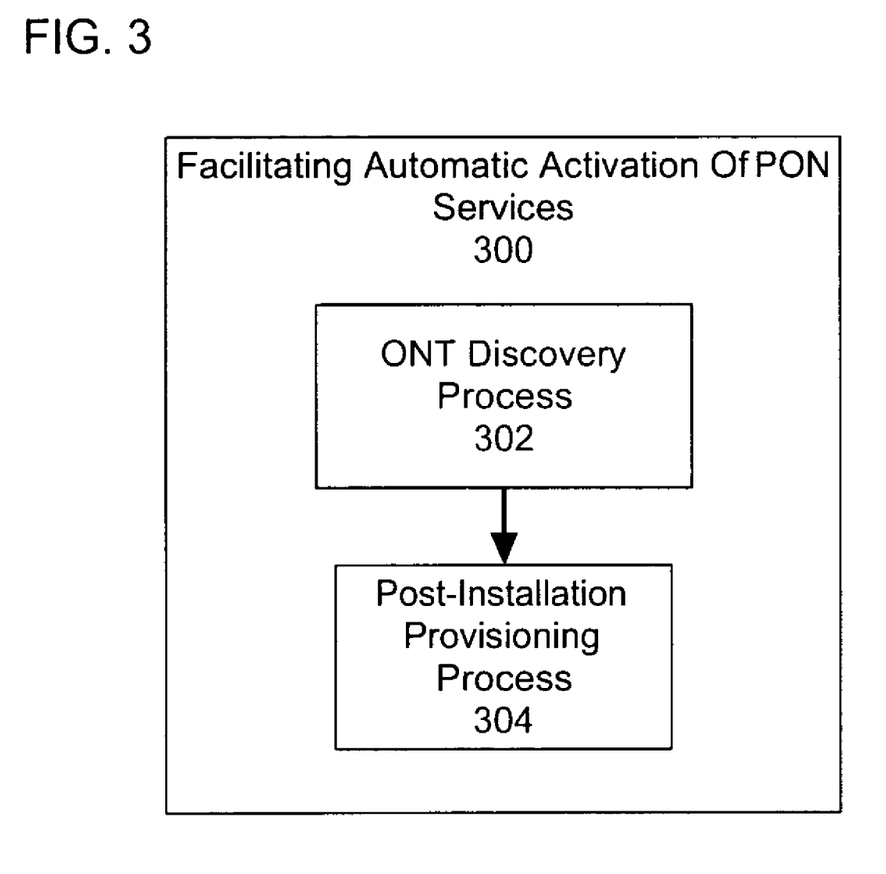
FIG. 3 depicts an embodiment of facilitating automatic activation of the pre-provisioned PON services depicted in FIG. 1.

FIG. 3 depicts an embodiment of facilitating automatic activation of the pre-provisioned PON services referred to in FIG. 1 at the block 300. As depicted, facilitating activation of the pre-provisioned PON services includes an ONT discovery process 302 and a post-installation provisioning process 304. After installation of the ONT is completed successfully, the ONT discovery process 302 is performed, followed by the post-installation provisioning process 304 being performed. During the ONT discovery process 302, information pertaining to the ONT (e.g., the ONT itself and its installed environment) is discovered in an automated manner. Following the ONT discovery process 302 being performed, at least a portion of such discovered information is utilized for enabling the post-installation provisioning process 304 to be carried out.

Figure 4:
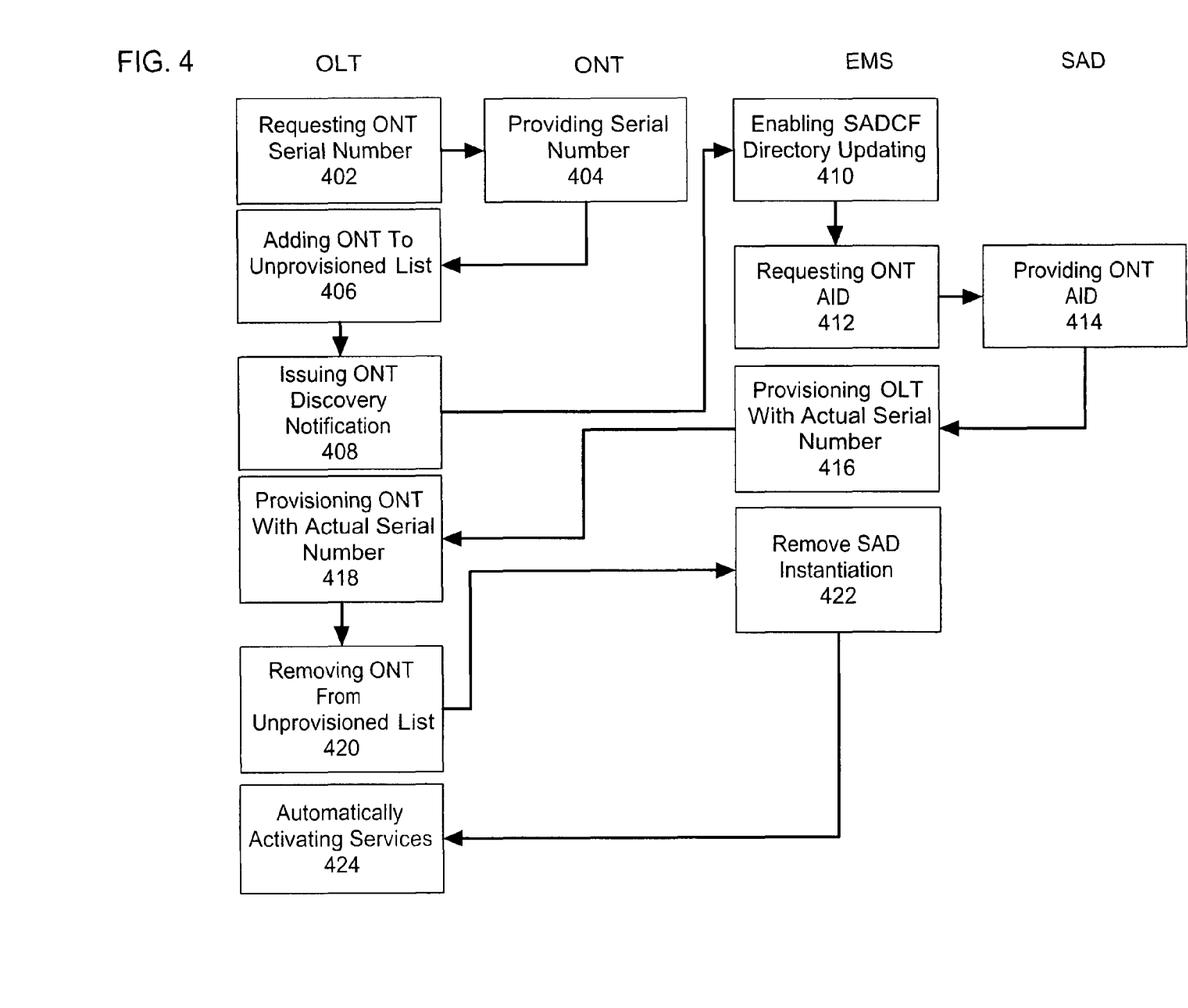
FIG. 4 depicts an embodiment of facilitating automatic activation of the pre-provisioned PON services in a manner that requires a pre-determined ONT to be installed at a particular service subscriber site

FIG. 4 depicts an embodiment of facilitating automatic activation of the pre-provisioned PON services in a manner that requires a pre-determined ONT (i.e., having a specified serial number) to be installed at a particular service subscriber site. In response to the OLT performing an operation 402 for requesting the serial number of the ONT, the ONT performs an operation 404 for providing its serial number (i.e., the actual serial number of the ONT) to the OLT. Polling the ONT in accordance with a specified ranging policy that requests the serial number of the ONT is an example of requesting the serial number of the ONT. In response to receiving the actual serial number of the ONT, the OLT performs an operation 406 for adding the actual serial number of the ONT to a list of unprovisioned ONT's, followed by the OLT performing an operation 408 for issuing (e.g., transmitting) an ONT discovery notification for reception by the EMS.

In response to the EMS receiving the ONT discovery notification, the EMS performs an operation 410 for enabling a change file of the SAD (i.e., the SADCF) to be updated. The process of adding items into the SADCF and the process of removing items from the SADCF (e.g., as required when installing new ONT's) are asynchronous, thus sometimes requiring simultaneous access to the SADCF by a reader and a writer of the SADCF. The operation 410 for enabling the SADCF to be updated permits such simultaneous access to the SADCF by the reader and the writer.

An embodiment of the operation 410 for enabling the SADCF to be updated includes reading the contents of a selected SADCF Directory. For example, an access privilege of "read only" is used by the EMS to identify select SADCF's that are ready for processing, thereby providing a mechanism for new SADCF's to be added to the SAD directory as other SADCF's are being processed by the EMS. After reading the contents of the selected SADCF directory, its contents are contatenated to the SAD, followed by removing the contents of the selected SADCF from the SADCF directory once its contents have been added to the SAD. This series of operations is repeated for each selected directory.

After the operation 410 for enabling the SADCF to be updated is performed, the EMS performs an operation 412 for requesting an ONT access identifier (ONT AID) from the SAD. An operation 414 is performed by the SAD for providing the ONT AID to the EMS in response to the SAD successfully finding the ONT AID for the ONT. The actual serial number of the ONT is used as a search key. In response to receiving the ONT AID, the EMS performs an operation 416 for provisioning the OLT with the actual serial number of the OLT, followed by the OLT performing an operation 418 for provisioning the ONT with the actual serial number of the ONT.

After the OLT and ONT are provisioned with the actual serial number of the ONT, the OLT performs an operation 420 for removing the ONT from the list of unprovisioned ONT's. In response to the OLT removing the ONT, the EMS performs an operation 422 for removing the SAD instantiation corresponding to the ONT from the list of unprovisioned ONT's. The actual serial number and the ONT AID identify the SAD instantiation corresponding to the ONT. After the EMS performs the operation 422 for removing the SAD instantiation corresponding to the ONT, the OLT performs an operation 424 for activating the appropriate (e.g., requested and paid for) PON services. Once the PON services are activated and after any necessary test calls (or data transfer operations) are successfully performed, the ONT enables the service subscriber to access the previously provisioned services and begins to process alarms, telephony, video and/or data traffic normally without further manual intervention.

The functionality associated with operations 402 through 408 depicted, in FIG. 4, is an embodiment of the ONT discovery process disclosed above. The functionality associated with operations 410 through 424, depicted in FIG. 4, is an embodiment of the post-installation provisioning process disclosed above.

Figure 5A:
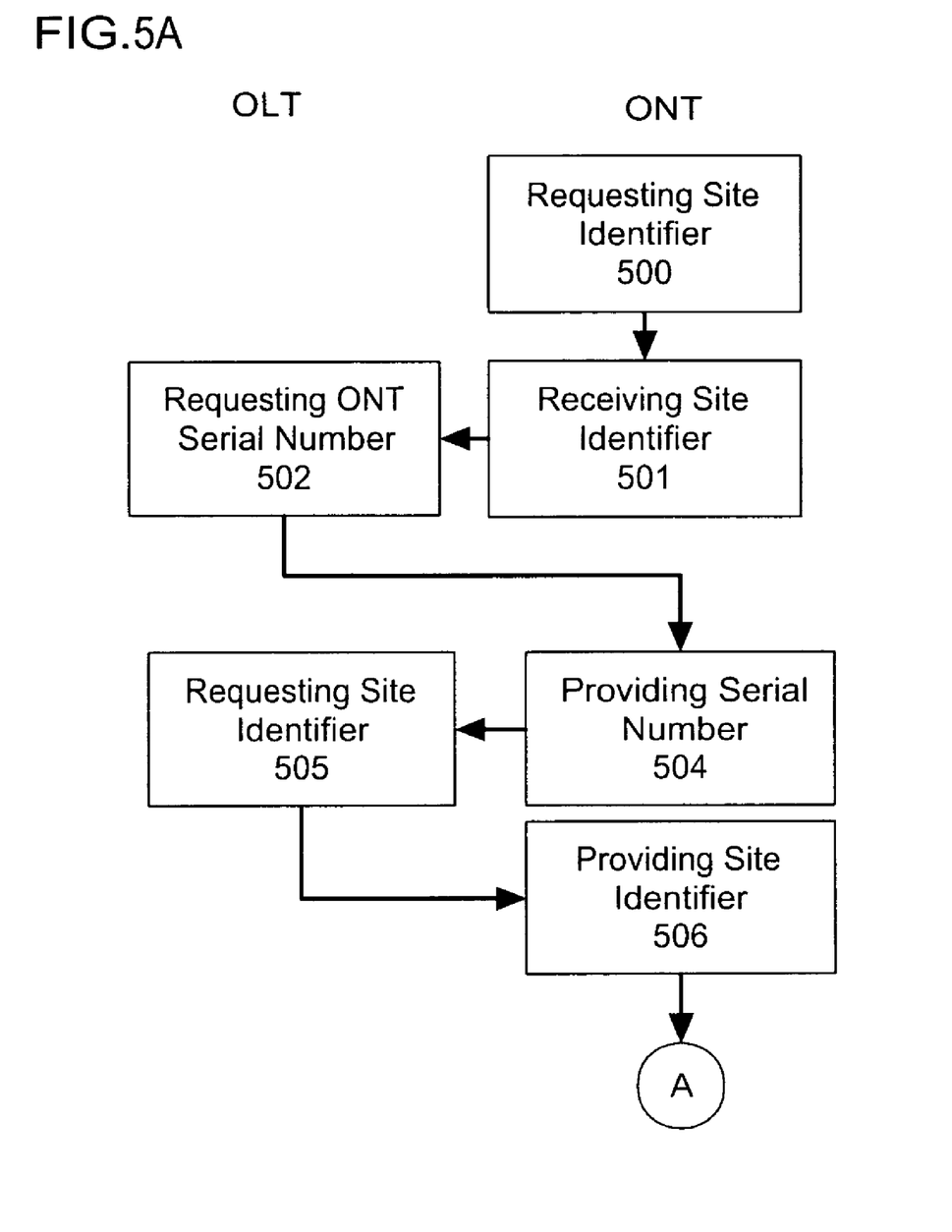
FIGS. 5A and 5B depict a first embodiment of facilitating automatic activation of the pre-provisioned PON services depicted in a manner that does not require a pre-determined ONT to be installed at a particular service subscriber site.
Figure 5B:
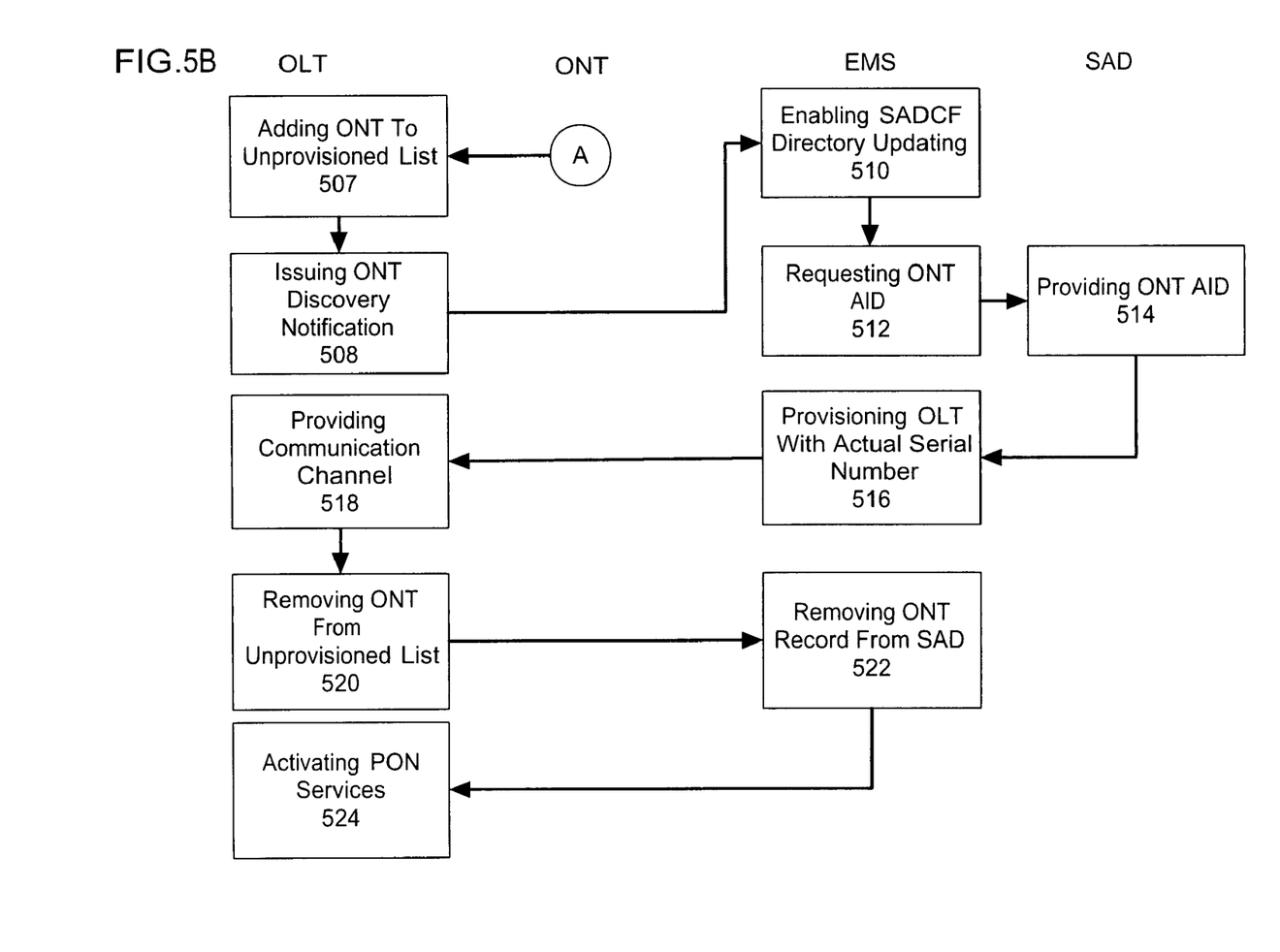

FIGS. 5A and 5B depict an embodiment of facilitating automatic activation of the pre-provisioned PON services in a manner that does not require a pre-determined ONT (i.e., having a pre-determined serial number) to be installed at a particular service subscriber site. For example, a craft person may install any legitimate ONT (i.e., any ONT within a collection of known uninstalled ONT's), rather than having to install a pre-determined ONT (e.g., having a pre-determined serial number). Enabling automatic activation of the pre-provisioned PON services in a manner that does not require a pre-determined ONT to be installed at a particular service subscriber site is advantageous in that it simplifies the logistics associated with providing a suitable and acceptable ONT for installation at the service subscriber site.

After the ONT performs an operation 500 for requesting a site identifier corresponding to the service subscriber site where the ONT is installed, the ONT performs an operation 501 for receiving the site identifier. Receiving the site identifier via a butt-end device or similar device of a craft person is an example of an approach for receiving the site identifier. It is also contemplated herein that the site identifier could be received from other types of input devices (e.g., an Ethernet RS 232-based input device). After the ONT has successfully received the site identifier, the OLT performs an operation 502 for requesting the serial number of the ONT, followed by the ONT performs an operation 504 for providing its serial number (i.e., the actual serial number of the ONT) to the OLT. Transmitting the actual serial number of the ONT from the ONT for reception by the OLT is an example of reporting the actual serial number of the ONT to the OLT. In response to receiving the actual serial number of the ONT, the OLT performs an operation 505 for requesting the site identifier from the ONT. After the ONT performs an operation 506 for providing the site identifier to the OLT, the OLT performs an operation 507 for adding the actual serial number of the ONT to a list of unprovisioned ONT's, followed by the OLT performing an operation 508 for issuing (e.g., transmitting) an ONT discovery notification for reception by the EMS.

In response to the EMS receiving the ONT discovery notification, the EMS performs an operation 510 for enabling the change file of the SAD (i.e., the SADCF) to be updated. After the operation 510 for enabling the SADCF to be updated is performed, the EMS performs an operation 512 for requesting an ONT access identifier (ONT AID) corresponding to the actual serial number from the SAD. An operation 514 is performed by the SAD for providing the ONT AID to the EMS in response to the SAD successfully finding the ONT AID for the ONT using the actual serial number of the ONT as a search key. In response to receiving the ONT AID, the EMS performs an operation 516 for provisioning the OLT with the actual serial number of the OLT, followed by the OLT performing an operation 518 for providing a communication channel between the OLT and ONT for enabling communication therebetween. Assigning an ONU (Optical Network Unit) Management and Communication Interface (OMCI) channel is an example of providing such a communication channel.

After the OLT is provisioned with the actual serial number of the ONT and the communication channel between the OLT and ONT is provided, the OLT performs an operation 520 for removing the ONT from the list of unprovisioned ONT's. In response to the OLT removing the ONT from the list of unprovisioned ONT's, the EMS performs an operation 522 for removing the SAD instantiation corresponding to the ONT, which is identified by the actual serial number and the ONT AID, from the list of unprovisioned ONT's. After the EMS performs the operation 522 for removing the SAD instantiation corresponding to the ONT, the OLT performs an operation 524 for activating the appropriate (e.g., requested and paid for) PON services. Once the PON services are activated and after any necessary test calls (or data transfer operations) are successfully performed, the ONT enables the service subscriber to access the previously provisioned services and begins to process alarms, telephony, video and/or data traffic normally without further manual intervention.

The functionality associated with operations 500 through 508, depicted in FIGS. 5A and 5B, is an embodiment of the ONT discovery process disclosed above. The functionality associated with operations 510 through 524, depicted in FIG. 5B, is an embodiment of the post-installation provisioning process disclosed above.

Figure 6A:
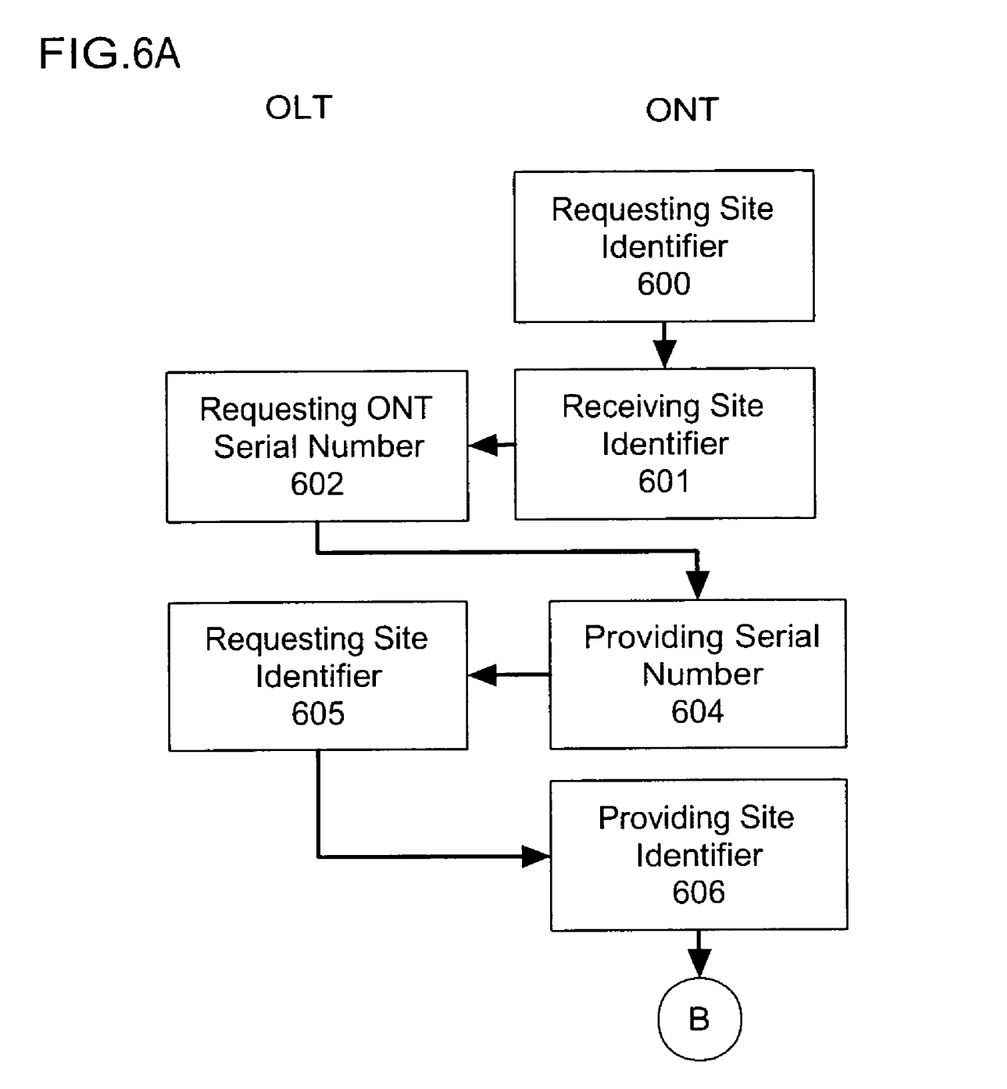
FIGS. 6A and 6B depict a second embodiment of facilitating automatic activation of the pre-provisioned PON services in a manner that does not require a pre-determined ONT to be installed at a particular service subscriber site.
Figure 6B:
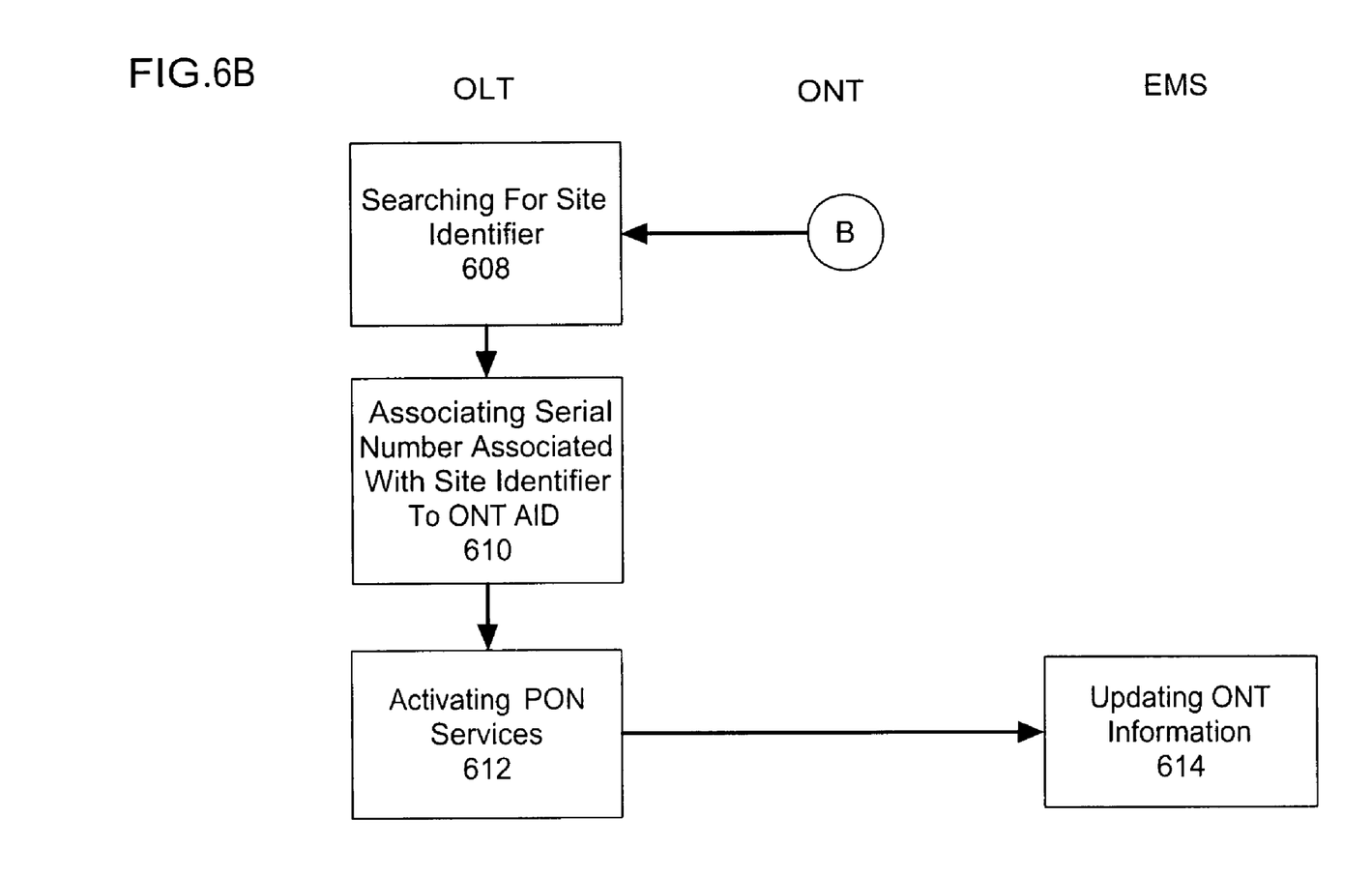

FIGS. 6A and 6B depict another embodiment of facilitating automatic activation of the pre-provisioned PON services in a manner that does not require a pre-determined ONT (i.e., having a pre-determined serial number) to be installed at a particular service subscriber site. After the ONT performs an operation 600 for requesting a site identifier corresponding to the service subscriber site where the ONT is installed, the ONT performs an operation 601 for receiving the site identifier. Receiving the site identifier via a butt-end device or similar device of a craft person is an example of an approach for receiving the site identifier. After the ONT has successfully received the site identifier, the OLT performs an operation 602 for requesting the serial number of the ONT, followed by the ONT performs an operation 604 for providing its serial number (i.e., the actual serial number of the ONT) to the OLT. In response to receiving the actual serial number of the ONT, the OLT performs an operation 605 for requesting the site identifier from the ONT.

After the ONT performs an operation 606 for providing the site identifier to the OLT, the OLT performs an operation 608 for searching internal information instantiations (e.g., database records) for the site identifier provided by the ONT (i.e., the specified site identifier). Each information instantiation of the OLT designates an ONT AID corresponding to a respective site identifier. In response to the OLT identifying an information instantiation containing the site identifier, the OLT performs an operation 610 for associating the serial number associated with the site identifier to the ONT AID within the identified information instantiation of the OLT.

After the OLT performs the operation 610 for associating the serial number associated with the site identifier to the ONT AID within the identified information instantiation of the OLT, the OLT performs an operation 612 for activating the appropriate (e.g., requested and paid for) PON services. The EMS then performs an operation 614 for updating an information instantiation of the EMS corresponding to the ONT to reflect the actual serial number of the ONT (e.g., in response to the OLT issuing an information instantiation update notification).

The functionality associated with operations 600 through 606, depicted in FIG. 6A is an embodiment of the ONT discovery process disclosed above. The functionality associated with operations 608 through 614, depicted in FIG. 6B is an embodiment of the post-installation provisioning process disclosed above.

Figure 7:
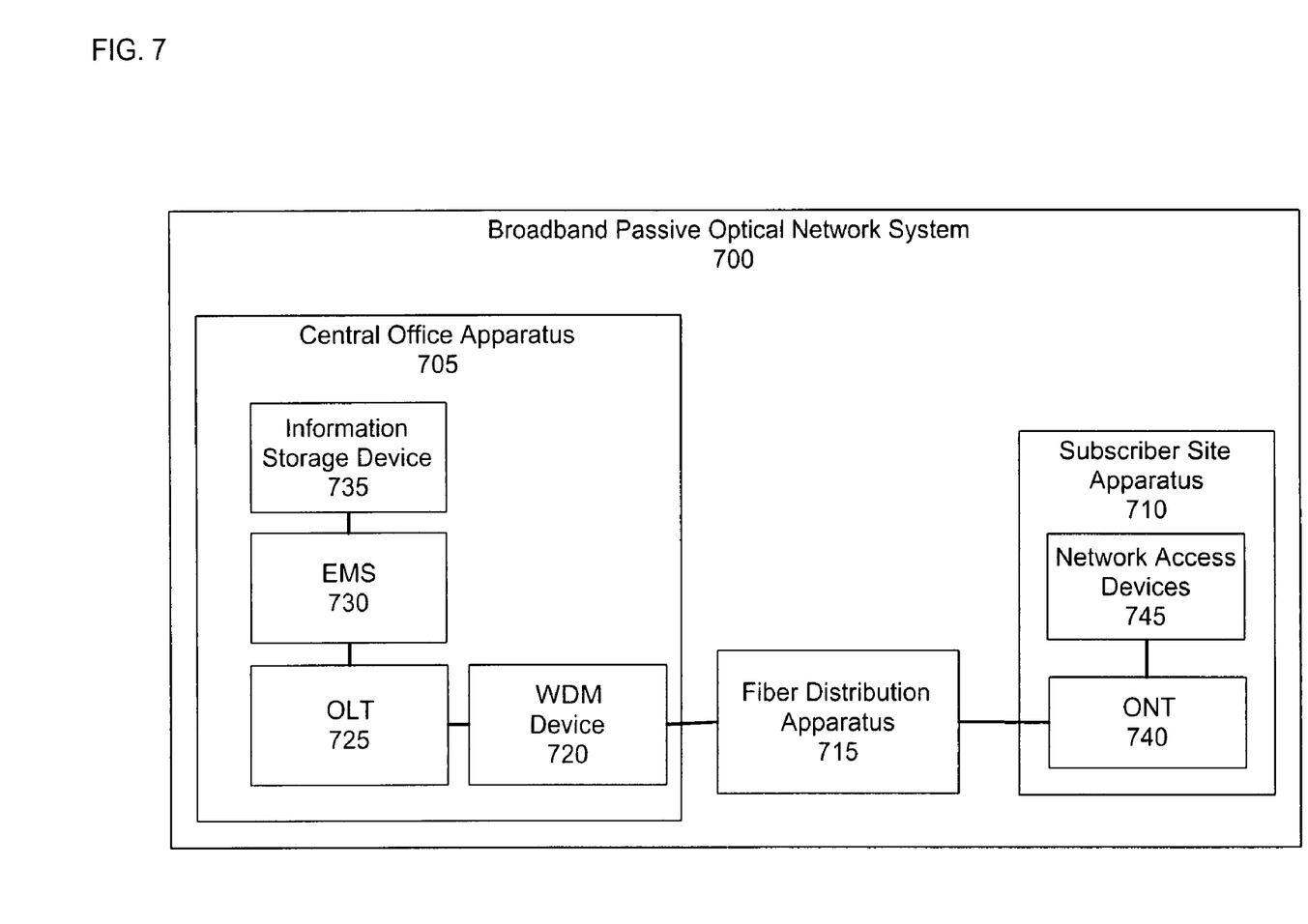
FIG. 7 depicts a Broadband Passive Optical Networking system configured for carrying out the methods processes and operations in accordance with an embodiment of the disclosures made herein.

Referring now to FIG. 7, a Broadband Passive Optical Network (BPON) system 700 capable of carrying out the methods processes and operations disclosed herein is depicted. The BPON system 700 includes a central office apparatus 705, a subscriber site apparatus 710 and a fiber distribution apparatus 715 connected therebetween. Information is transmitted bi-directionally between the central office apparatus 705 and the subscriber site apparatus 710 via the fiber distribution network 715.

A BPON system, the current global standard for passive optical networking systems, is a combination of PON and Wavelength Division Multiplexing (WDM) solutions. PON enables the shared use of fiber for services such as data voice and video over most of the distance between a central office and service subscriber sites. Wavelength Division Multiplexing (WDM) divides light signals into different colors (i.e., wavelengths) and enables bi-directional transmission over a single fiber. WDM enables multiple transmissions to and from service subscriber sites to travel as different colors of light over the same fiber using multiplexing and demultiplexing techniques, thus allowing a single fiber connection to serve multiple service subscribers. Each color of light has its own wavelength and its own frequency. The electronic equipment on each end of the fiber can distinguish the different signals by their color. Accordingly, a first wavelength of light (i.e., a first color) may be used for transmitting information in a first direction through a fiber of the fiber distribution apparatus 715 (e.g., toward the subscriber site apparatus 710) and a second wavelength of light (i.e., a second color) may be used for transmitting information in a second direction through a fiber of the fiber distribution apparatus 715 (e.g., toward the central office apparatus 705).

The central office apparatus 705 facilitates the transmission of information between the subscriber site apparatus 710 and a core network (i.e., a network including various public networks such as the Internet and private networks). The central office apparatus 705 includes a WDM device 720, an OLT 725, an EMS 730 and an information storage device 735. The WDM device 720 is configured for providing WDM functionality, as discussed above. The OLT provides network-side interfaces and functions as an optical access multiplexer for performing concentration and grooming of broadband packet traffic between the core network and the subscribers. The OLT includes means (e.g., software) capable of carrying out at least a portion of the methods, processes and/or operations disclosed herein. The EMS 730 includes software that manages sets of OLT's (e.g., via software capable of facilitating at least a portion of the methods, processes and/or operations disclosed herein). The information storage device 735 provides storage space of information instantiations (e.g., database records) corresponding to the each OLT and/or ONT in the BPON system 700.

The subscriber site apparatus 710 includes an ONT 740 connected between one or more network access devices 745 at the subscriber site and the fiber distribution apparatus 715. The ONT 740 is a network interface device that serves information to and/or transmits information from such one or more network access devices 745 at the subscriber site. Computers, telephones, televisions and the like are examples of such network access devices 745. In at least one embodiment of the BPON system 700, the ONT 740 includes software capable of facilitating at least a portion of the methods, processes and/or operations disclosed herein.

The fiber distribution apparatus 715 includes fiber optic cables, splicing enclosures, fiber distribution cabinets/enclosures, drop boxes and the like. An advantageous aspect of the fiber distribution apparatus 715 is that it includes only passive elements. In one embodiment, the fiber distribution apparatus depicts a point-to-multipoint downstream fiber network (i.e., toward the subscriber site apparatus 710) and a multipoint-to-point upstream fiber network (i.e., toward the central office apparatus 705).

A BPON system, such as the BPON system 700 disclosed above, represents one specific example of a PON system capable of carrying out the methods, processes and/or operations disclosed herein. It is contemplated herein that other current, emerging and yet to be developed PON solutions are also capable of carrying out the methods, processes and/or operations disclosed herein. EPON and GPON systems are examples of such other PON solutions capable of carrying out the methods, processes and/or operations disclosed herein Referring now to computer readable medium, methods, processes and/or operations adapted for carrying out PON service activation functionality as disclosed herein are tangibly embodied by computer readable medium having instructions thereon for carrying out such functionality. In one specific embodiment, the instructions are tangibly embodied for carrying out the method 100, disclosed above, for facilitating activation of PON services. The instructions may be accessible by one or more data processors (e.g., of one or more elements of the BPON system 700) from a memory apparatus (e.g. RAM, ROM, virtual memory, hard drive memory, etc), from an apparatus readable by a drive unit of the data processing system (e.g., a diskette, a compact disk, a tape cartridge, etc) or both. Accordingly, examples of computer readable medium include a compact disk or a hard drive that has imaged thereon a computer program (i.e., a set of instructions) adapted for carrying out PON service activation functionality disclosed herein.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical, mechanical and electrical changes may be made without departing from the spirit or scope of the invention. For example, functional blocks shown in the figures could be further combined or divided in any manner without departing from the spirit or scope of the invention. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method for activating services in a Passive Optical Networking (PON) system, comprising:
   accessing instructions for facilitating activation of PON services including one or more data processors from a memory apparatus, from a apparatus readable by a drive unit of the data processing system or both located at a service provider local;
   facilitating pre-provisioning of an Optical Line Terminal (OLT) within a PON system wherein said pre provisioning includes provisioning PON services on the OLT prior to installing an Optical Network Termination unit (ONT) controlled by the OLT, wherein the OLT is pre-provisioned with at least a first information required for facilitating automatic activation of said PON services;
   said facilitating automatic activation of said PON services, using at least said first information, after installation of the ONT is completed at a service subscriber site, wherein said PON services are served by the ONT; and
   provisioning, after the installation of the ONT, the OLT with an actual identifier information of the ONT, by replacing said first information with said actual identifier, when the actual identifier is different from said first information.

2. The method of claim 1 wherein facilitating said automatic activation of said PON services includes:
   identifying the ONT as being unprovisioned; and
   determining said actual identifier information of the ONT after identifying the ONT as being unprovisioned.

3. The method of claim 2 wherein:
   said determining actual identifier information of the ONT includes determining an actual serial number of the ONT; and
   said provisioning the OLT with said actual identifier information includes replacing a system-assigned ONT serial number provisioned on the OLT with the actual serial number in response to utilizing the actual serial number of the ONT to determine an access identifier of the ONT.

4. The method of claim 3 wherein:
   said pre-provisioning further includes pre-provisioning a Service Association Database (SAD) with at least a second information required for facilitating said automatic activation of said PON services;
   said second information required for facilitating said automatic activation includes at least one a serial number, an ONT access identifier and a site identifier; and
   said facilitating automatic activation of said PON services further includes enabling asynchronous operations of adding information associated with said automatic activation to the SAD and removing information associated with said automatic activation from the SAD, wherein said enabling is performed after said actual identifier information of the ONT is determined.

5. The method of claim 1 wherein facilitating said automatic activation of said PON services includes performing:
   an ONT discovery process for discovering information associated with the ONT; and
   a post-installation provisioning process for provisioning the OLT with at least a third information discovered through the ONT discovery process.

6. The method of claim 5 wherein:
   the ONT discovery process includes determining actual identifier information of the ONT; and the post-installation provisioning process includes provisioning the OLT with at least said actual identifier information of the ONT.

7. The method of claim 6 wherein:

said determining actual identifier information of the ONT includes determining an actual serial number of the ONT; and said provisioning the OLT with at least said actual identifier information includes utilizing the actual serial number of the ONT to determine an access identifier of the ONT and provisioning the OLT with the actual serial number of the ONT.

8. A computer readable medium, comprising:

instructions processable by at least one element of a Passive Optical Network (PON) system; and at least one of:

one or more data processors from a memory apparatus and an apparatus readable by a drive unit of the data processing system, from which said instructions are accessible by said at least one element of the PON system;

wherein said instructions are adapted for enabling said at least one element of the PON system to facilitate:

pre-provisioning of an Optical Line Terminal (OLT) within a PON system, wherein said pre provisioning includes provisioning PON services on the OLT prior to installing an Optical Network Termination unit (ONT) controlled by the OLT, wherein the OLT is pre-provisioned with at least a first information required for facilitating automatic activation of said PON services;

said automatic activation of said PON services after installation, using at least said first information, of the ONT is completed, wherein said PON services are served by the ONT; and provisioning, after the installation of the ONT, the OLT with an actual identifier information of the ONT, by replacing said first information with said actual identifier, when the actual identifier is different from said first information.

9. The computer readable medium of claim 8 wherein said automatic activation of said PON services includes:

identifying the ONT as being unprovisioned;

determining said actual identifier information of the ONT after identifying the ONT as being unprovisioned; and provisioning the OLT with at least said actual identifier information of the ONT after determining said actual identifier information is performed.

10. The computer readable medium of claim 9 wherein:

said determining actual identifier information of the ONT includes determining an actual serial number of the ONT; and said provisioning the OLT with actual identifier information includes replacing a system-assigned ONT serial number provisioned on the OLT with the actual serial number in response to utilizing the actual serial number of the ONT to determine an access identifier of the ONT.

11. The computer readable medium of claim 10 wherein:

said pre-provisioning further includes pre-provisioning a Service Association Database (SAD) with at least a second information required for facilitating said automatic activation of said PON services;

said information required for facilitating said automatic activation includes at least one a serial number, an ONT access identifier and a site identifier; and said facilitating automatic activation of said PON services further includes enabling asynchronous operations of adding information associated with said automatic activation to the SAD and removing information associated with said automatic activation from the SAD, wherein said enabling is performed after said actual identifier information of the ONT is determined.

12. The computer readable medium of claim 8 wherein said automatic activation of said PON services includes performing:

an ONT discovery process for discovering information associated with the ONT; and a post-installation provisioning process for provisioning the OLT with at least a third information discovered through the ONT discovery process.

13. The computer readable medium of claim 12 wherein:

the ONT discovery process includes determining actual identifier information of the ONT; and the post-installation provisioning process includes provisioning the OLT with at least said actual identifier information of the ONT.

14. The computer readable medium of claim 13 wherein:

said determining actual identifier information of the ONT includes determining an actual serial number of the ONT; and said provisioning the OLT with at least said actual identifier information includes utilizing the actual serial number of the ONT to determine an access identifier of the ONT and provisioning the OLT with the actual serial number of the ONT.

15. A computer readable medium, comprising:

instructions processable by at least one element of a Passive Optical Network (PON) system; and at least one of: one or more data processors from a memory apparatus and an apparatus readable by a drive unit of the data processing system, from which said instructions are accessible by said at least one element of the PON system;

wherein said instructions are adapted for enabling said at least one element of the PON system to facilitate:

pre-provisioning an Optical Line Terminal (OLT) within a PON system with PON services and with at least a first information required for facilitating automatic activation of said PON services prior to installing an Optical Network Termination unit (ONT) controlled by the OLT;

said automatically activating said PON services served by the ONT, using at least said first information, after installation of the ONT is complete, wherein said activating includes discovering information associated with the ONT after installation of the ONT is completed and provisioning the OLT with at least said discovered ONT information, wherein the OLT is provisioned with an actual identifier information, from the discovered ONT information; and replacing said first information with said actual identifier, when the actual identifier is different from said first information.

16. The computer readable medium of claim 15 wherein:

said discovering includes determining an actual serial number of the ONT; and said provisioning the OLT includes utilizing the actual serial number of the ONT to determine an access identifier of the ONT and provisioning the OLT with the actual serial number of the ONT.

17. The computer readable medium of claim 16 wherein:
said provisioning the OLT with the actual serial number of the ONT includes replacing a system-assigned serial number of the ONT with the actual serial number of the ONT; and
the system-assigned serial number designates the ONT as being unprovisioned.

18. The computer readable medium of claim 17 wherein:
said automatically activating PON services further includes enabling Service Association Database (SAD) updating; and
said enabling SAD updating permits asynchronous operations of adding information associated with said automatic activation to the SAD and removing information associated with said automatic activation from the SAD.

19. The computer readable medium of claim 15 wherein:
said discovering includes determining an actual serial number of the ONT and receiving a site identifier designating an installed location of the ONT; and
said provisioning the OLT includes provisioning the OLT with the actual serial number in response to utilizing the site identifier to determine an access identifier of the ONT.

20. The computer readable medium of claim 19 wherein:
said provisioning the OLT with the actual serial number of the ONT includes replacing a system-assigned serial number of the ONT with the actual serial number of the ONT; and
the system-assigned serial number designates the ONT as being unprovisioned.

21. The computer readable medium of claim 20 wherein:
said automatically activating PON services further includes enabling Service Association Database (SAD) updating; and
said enabling SAD updating permits asynchronous operations of adding information associated with said automatic activation to the SAD and removing information associated with said automatic activation from the SAD.

22. The computer readable medium of claim 20 wherein said automatically activating PON services includes providing a communication channel between the ONT and the OLT for enabling communication therebetween.

* * * * *